(12) United States Patent
Moretto (10) Patent No.: US 7,137,729 B2
(45) Date of Patent: Nov. 21, 2006

(54) GRAVIMETRIC DOSING AND MIXING APPARATUS FOR A PLURALITY GRANULAR PRODUCTS

(75) Inventor: Renato Moretto, Massanzago (IT)

(73) Assignee: Moretto S.p.A., Massanzago-Padova (IT)

( * ) Notice: Subject to any disclaimer, the term of this patent is extended or adjusted under 35 U.S.C. 154(b) by 14 days.

(21) Appl. No.: 10/397,370

(22) Filed: Mar. 27, 2003

(65) Prior Publication Data

US 2003/0185095 A1    Oct. 2, 2003

(30) Foreign Application Priority Data

Mar. 28, 2002   (IT) ........................ VR2002A0028

(51) Int. Cl.
*B01F 3/18* (2006.01)
*B01F 15/02* (2006.01)

(52) U.S. Cl. ...................................... 366/141
(58) Field of Classification Search ............... 366/141, 366/181.3, 181.1, 177.1, 325.3; 177/187, 177/188, 189; 222/508, 505; 251/302, 300
See application file for complete search history.

(56) References Cited

U.S. PATENT DOCUMENTS

| 892,944 | A | * | 7/1908 | Drawe ................... 73/864.63 |
|---|---|---|---|---|
| 1,823,443 | A | * | 9/1931 | Gamm ........................ 241/65 |
| 3,998,426 | A | * | 12/1976 | Isbester ...................... 251/147 |
| 4,459,028 | A | * | 7/1984 | Bruder et al. ............... 366/141 |
| 4,593,778 | A | * | 6/1986 | Konishi et al. ............. 177/185 |
| 4,638,875 | A | * | 1/1987 | Murray ......................... 177/1 |
| 4,790,457 | A | * | 12/1988 | Morse et al. ................ 222/158 |
| 4,793,711 | A | * | 12/1988 | Ohlson ....................... 366/141 |
| 4,844,292 | A | * | 7/1989 | Lonardi et al. ............. 222/503 |
| 4,850,443 | A | * | 7/1989 | Bergholt et al. ............ 177/188 |
| 4,895,450 | A | * | 1/1990 | Holik .......................... 366/141 |
| 5,340,211 | A | * | 8/1994 | Pratt ........................... 366/141 |
| 5,527,107 | A | * | 6/1996 | Weibel et al. .............. 366/141 |
| 6,007,236 | A | * | 12/1999 | Maguire ..................... 366/141 |
| 6,155,709 | A | * | 12/2000 | O'Callaghan ............... 366/141 |
| 6,479,767 | B1 | * | 11/2002 | Zicher ......................... 177/145 |

FOREIGN PATENT DOCUMENTS

WO     WO 98/05932    *  2/1998

* cited by examiner

*Primary Examiner*—Tony G. Soohoo
(74) *Attorney, Agent, or Firm*—Nixon & Vanderhye P.C.

(57) ABSTRACT

A gravimetric dosing apparatus includes a support frame, a plurality of loading hoppers for a respective granular material to be dosed, carried by the support frame and provided with a respective discharge outlet and an opening-closing device for their respective discharge outlet. A weighing hopper includes a discharge outlet and an opening and closing device for its respective discharge outlet and arranged in cascade with respect to the loading hoppers to receive from at least two of the hoppers dosed quantities of different granular materials. A support element is articulated to the frame and designed to overhangingly support the weighing hopper. Transducing structure generates output signals proportional to the weight of the material discharged into the weighing hopper. A mixing assembly receives the dosed and weighed granular material, and a program control unit receives input signals from the transducer and program controls the opening-closing devices.

5 Claims, 8 Drawing Sheets

GRAVIMETRIC DOSING AND MIXING APPARATUS FOR A PLURALITY GRANULAR PRODUCTS

BACKGROUND OF THE INVENTION

The present invention relates to an apparatus for gravimetrically dosing various loose products, such as granular, milled, powdered products or the like (hereafter generally referred to as "granular material"), in order to obtain a blend of a plurality of products dosed with a great precision.

As known to a skilled person in the art, gravimetric dosing machines have already been proposed, which are provided with two or more feeding hoppers arranged side-by-side, that can be up to six or more in number, which are designed to feed by gravity an underlying weighing hopper that is in turn designed to discharge the material fed thereto into an underlying mixing-homogeneising hopper. The sequence of the various operating stages is controlled by a programmable control unit.

However, although satisfactory from many points of view, dosing machines known in the art have a poor degree of weighing resolution, whereby for many industrial uses they do not provide a sufficient guarantee in so far as precision and adequate speed of formation and weighing of dosed mixtures are concerned, e.g. to keep up with the pace of other operating units of a plant designed to use the blends formed according to specific recipes.

SUMMARY OF THE INVENTION

The present invention is primarily directed to providing a gravimetric dosing apparatus suitable for obviating or drastically reducing the shortcomings to be faced with the solutions according to the state of the art.

Another object of the present invention is to provide a gravimetric dosing apparatus suitable for ensuring an enhanced weighing resolution to obtain mixtures dosed with a great precision, regardless of unavoidable ambient temperature fluctuations or from vibrations.

Another object of the present invention is to provide a dosing apparatus that is suitable for forming dosed blends including a plurality of components with a great operating speed and consistency, so as to ensure both constantly high precision dosages and a high productivity.

A not last object of the present invention is to provide a highly efficient and effective dosing apparatus which can be manufactured at competitive costs.

These and other objects that will be better apparent below are achieved by a gravimetric dosing apparatus according to the present invention, which has a support frame, a plurality of loading hoppers for a respective granular material to be dosed, each carried by the support frame and provided with a respective discharge outlet and an opening-closing device for their respective discharge outlet, a weighing hopper including a discharge outlet and an opening and closing device for its respective discharge outlet and arranged in cascade with respect to the loading hoppers to receive from at least two of the hoppers dosed quantities of different granular materials, a support element articulated to the frame and designed to overhangingly support the weighing hopper, transducing structure located between the frame and the articulated support element and designed to generate output signals proportional to the weight of the material discharged into the weighing hopper, a mixing assembly carried by the support frame and arranged in cascade with respect to the weighing hopper, whereby dosed and weighed granular material is received therefrom, and a program control unit that receives input signals from the transducing structure and that program controls the opening-closing device. The opening-closing device includes a pair of opening and closing bucket-like elements articulated to one another about a common articulation axis, a reciprocating actuator, and a fork-shaped linkage member having one fork-shaped end pivoted to the bucket-like elements, respectively, and having an opposite end pivoted to the reciprocating actuator, thereby obtaining short response times of the opening-closing device.

Advantageously, the transducing structure comprises at least one digital weighing cell designed to perform a specified number n of weighing operations per second, among which a number $k<n$ of weighings considered to be valid is program selected, a number $m<k$ of which must result to be equal to each other.

BRIEF DESCRIPTION OF THE DRAWINGS

Further aspects and advantages of the present invention will become apparent from the following detailed description of one preferred but not exclusive embodiment of a gravimetric dosing apparatus illustrated by way of indicative not limiting example in the accompanying drawings, in which.

In the Figures of the accompanying drawings the same or similar parts and components are designated by the same reference numerals.

DESCRIPTION OF THE PREFERRED EMBODIMENTS

With reference to the above listed Figures, it will be noted that a gravimetric dosing apparatus according to the present invention is generally designated at 1 and has a support frame 2 which delimits at its top four compartments for accommodating a respective loading hopper 3, 4, 5 and 6, that is designed to be removably located in a respective compartment and to contain a specific granular material to be dosably dispensed. Preferably, loading hoppers 3 to 6 are equal to each other, so far as both conformation and size are concerned, and interchangeable with one another, or can have different, e.g. double, capacity.

Figure 6:
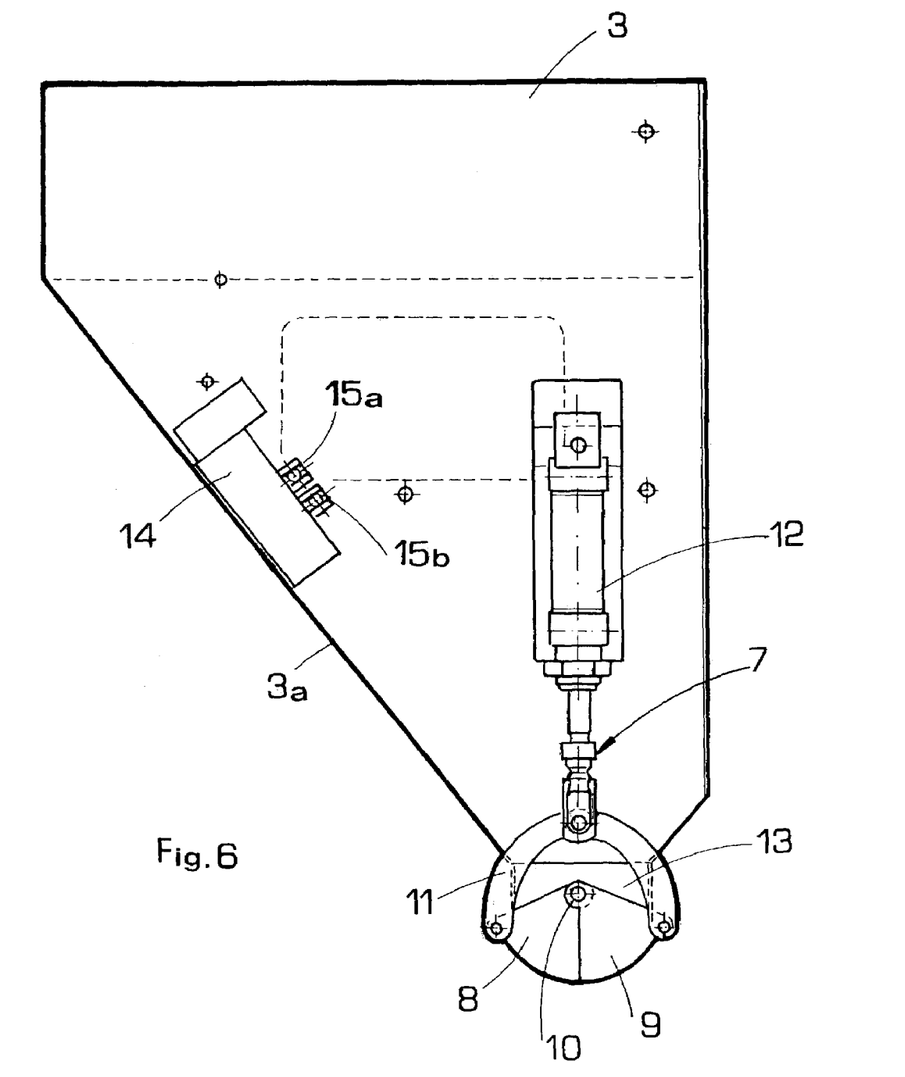
FIGS. 6 and 7 each show a front elevation view of a loading hopper provided with an opening-closing device at its own discharge outlet, in an opening and a closing position, respectively.
Figure 7:
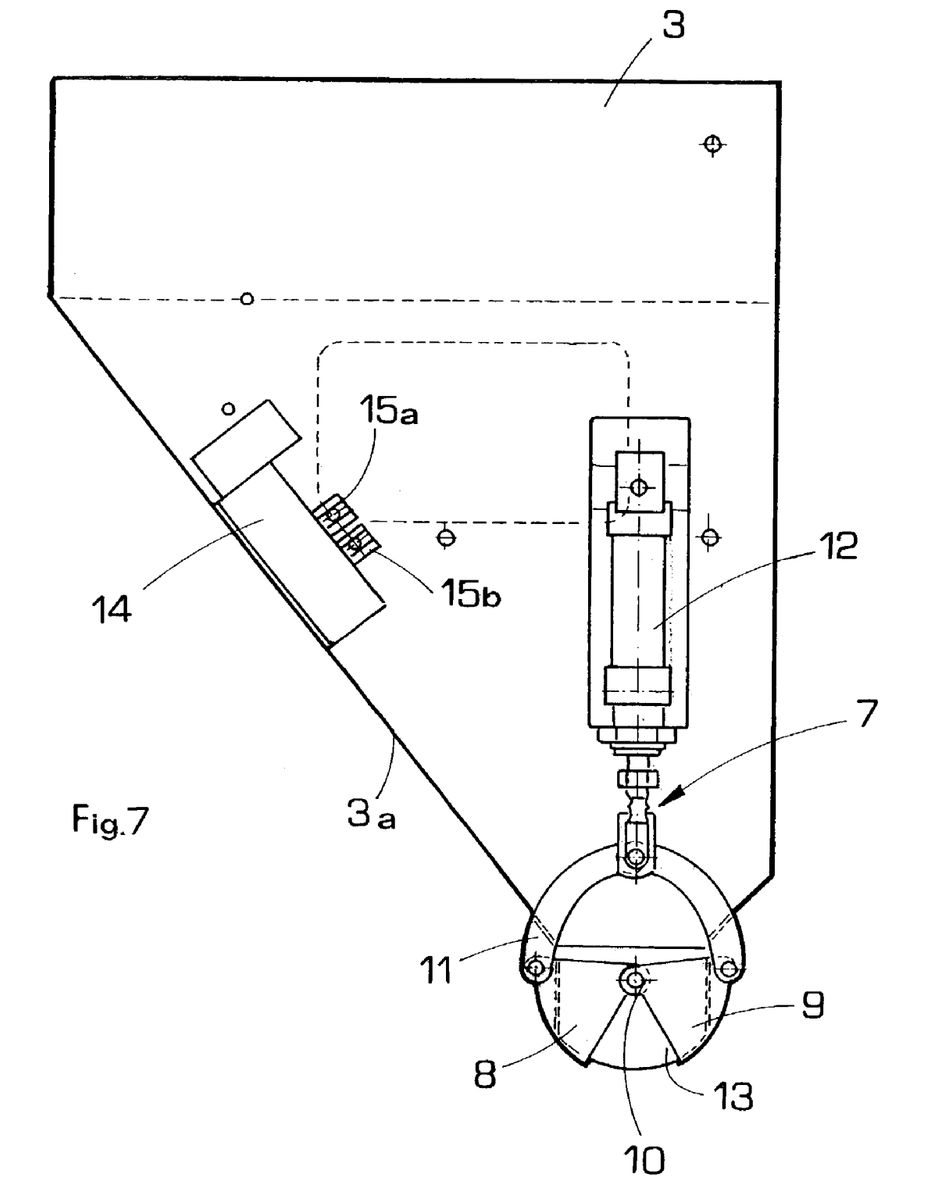

Each loading hopper from 3 to 6 has a lower discharge outlet designed to be opened and closed by suitable checking means designated at 7 and better visible in FIGS. 6 and 7. Such checking means, or opening-closing device, can comprise either by two locks movable into mutual abutment engagement, and away from one another, or, preferably, by two opening and closing elements 8 and 9. The opening and closing elements 8 and 9 are shaped as a bucket or a cylindrical sector eyelid-like element, and centrally articulated about a horizontal axis 10 and laterally to a respective end of a fork 11. Said fork 11 is in turn pivoted about the free end of a reciprocating actuator, e.g. a double acting air or electromechanically operated jack 12 fixed to one side of its respective loading hopper. The use of two checking means of the discharge outlet of the hoppers makes it possible to shorten the response times of the opening-closing device.

More particularly, for anchoring each bucket or eyelid-like element at one end of the fork 11, a bush and a tempered washer are provided so as to cause sliding movement to occur on hard steel and thus provide a long lasting fixing in position with reduced friction for angular displacements of the bucket or the eyelid-like shaped opening-closing means.

Inclined calibration flaps 13 are arranged close to the discharge outlet of loading hoppers 3 to 6, said flaps being designed to prevent any grains of material discharged by the hopper from ending up falling between the hopper wall and the bucket or eyelid-like checking elements, or between the checking elements and fork 11.

Each jack 12 is suitable for being fed by a compressed air source (not shown) of any suitable type, such as a compressed air mains that feeds a looped line, e.g. arranged within the support frame 2, by means of an electrovalve 14 for each jack 12, so that the path followed by compressed air from the delivery loop to jack 12 is the same for all loading hoppers whereby consistent response times are obtained for each opening-closing device 7.

As better shown in FIG. 6, each electrovalve 14 comprises a pair of driving solenoids 15a and 15b and is fixed, e.g. to an inclined and flanged edge 3a of its respective hopper, but only at the center of the valve body. Two openings or holes are provided in the flanged edge 3a at the closing plugs for the solenoids in order to prevent the closing plugs, once loaded by their respective solenoid, from causing deformations in the electrovalve attitude that might affect their proper operation.

Figure 2:
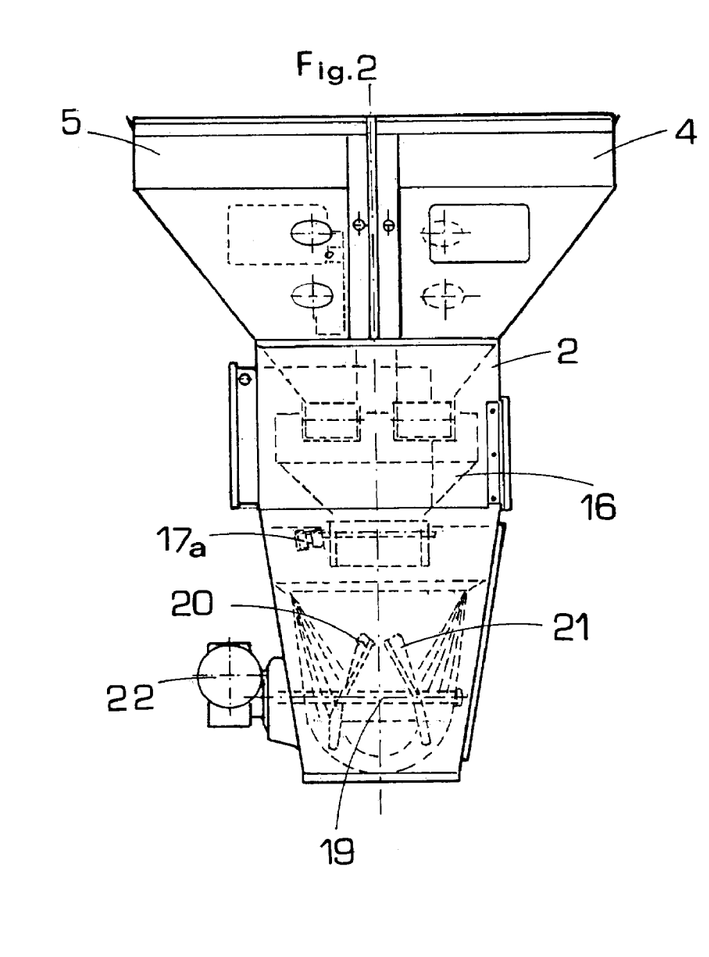
FIG. 2 illustrates a side view of the apparatus of FIG. 1.
Figure 2A:
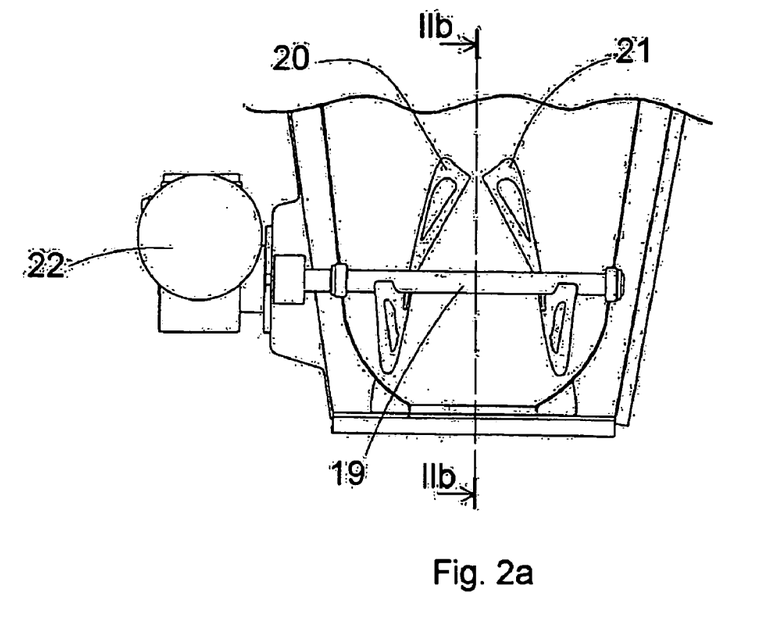
Figure 2B:
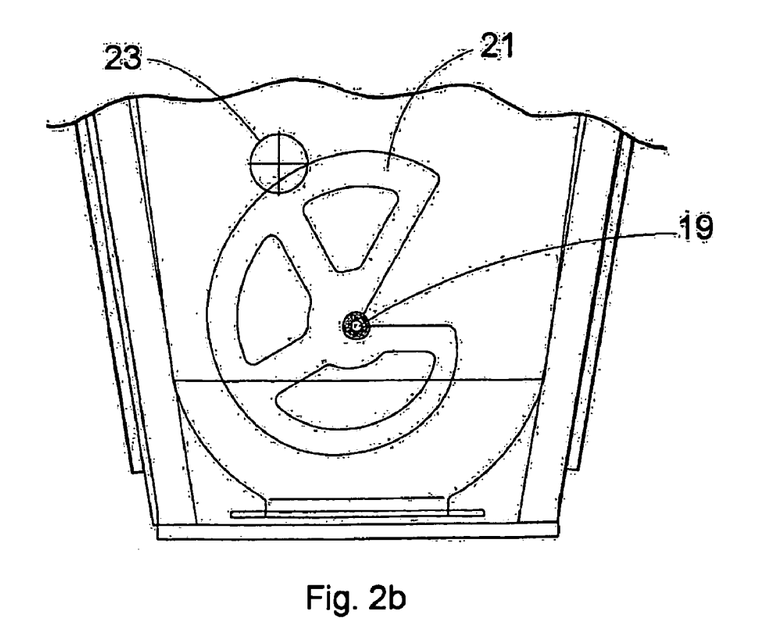
Figure 3:
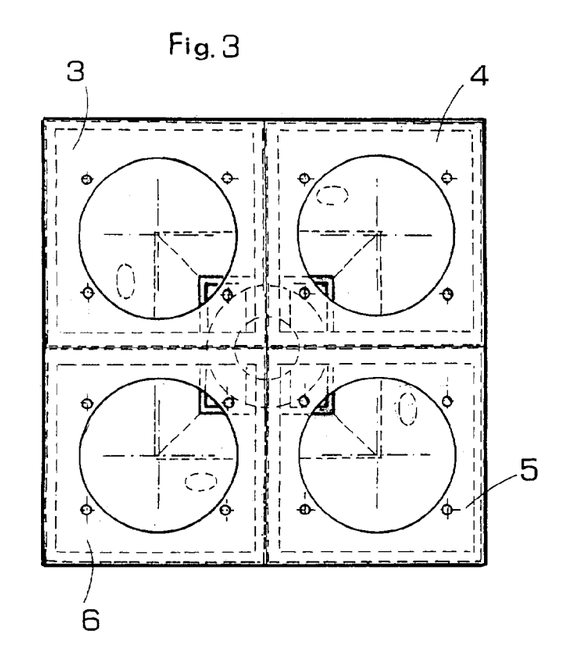
FIG. 3 shows a top plan view of the apparatus of FIG. 1.
Figure 4:
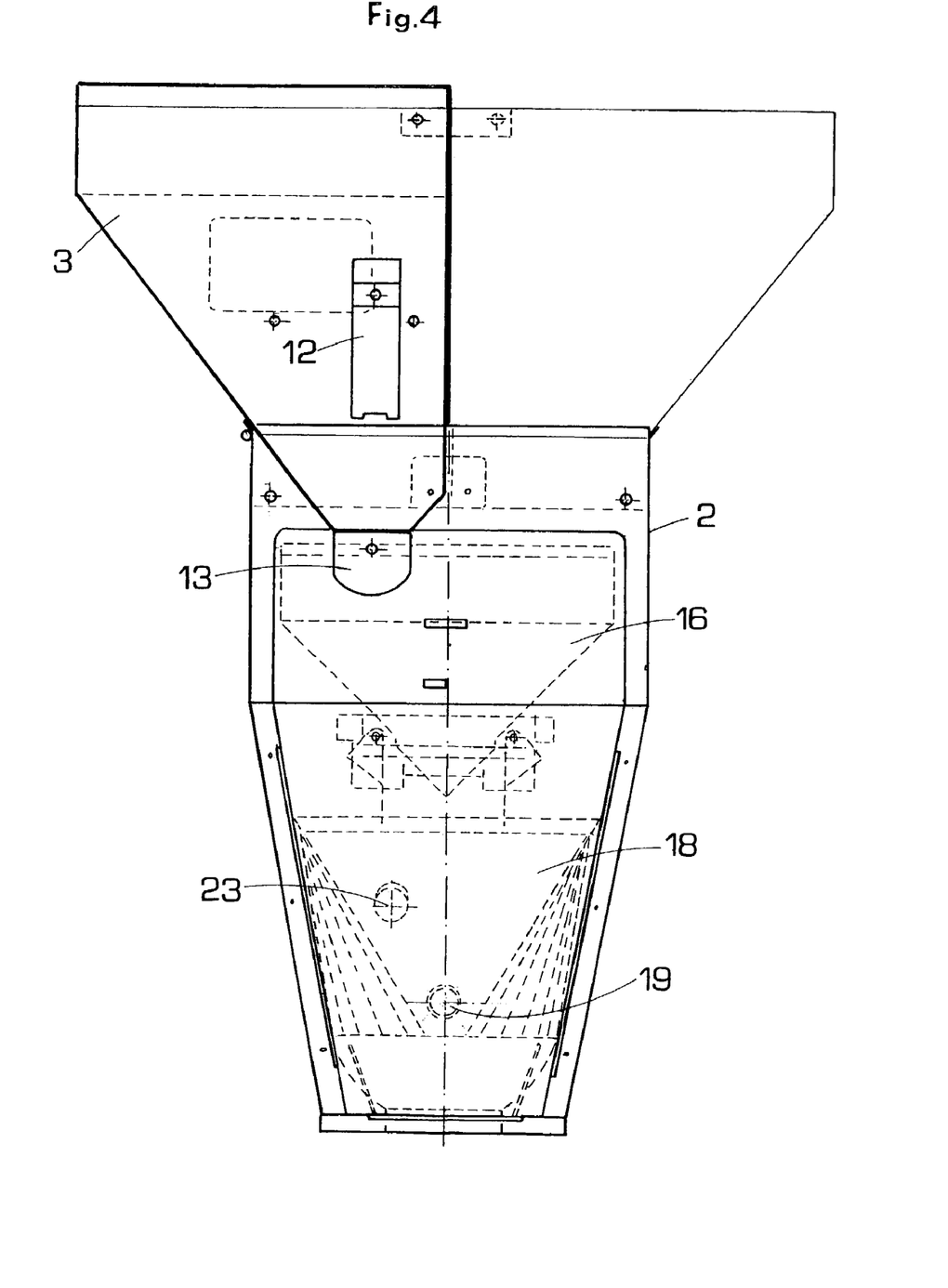
FIG. 4 is a front elevation view on an enlarged scale of the apparatus of FIG. 1 where some charging hoppers have been removed.
Figure 5:
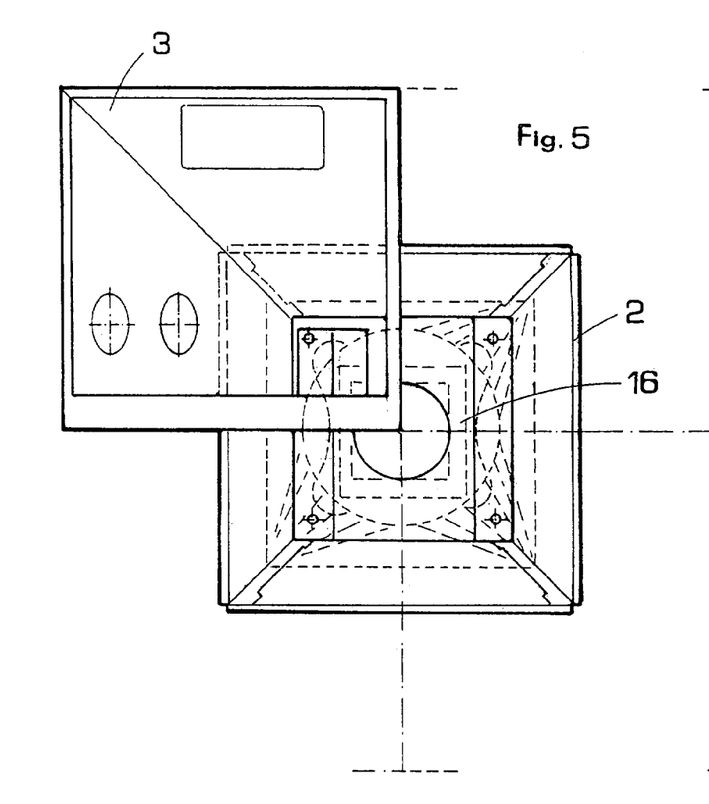
FIG. 5 illustrates a top plan view of the apparatus of FIG. 4.
Figure 8:
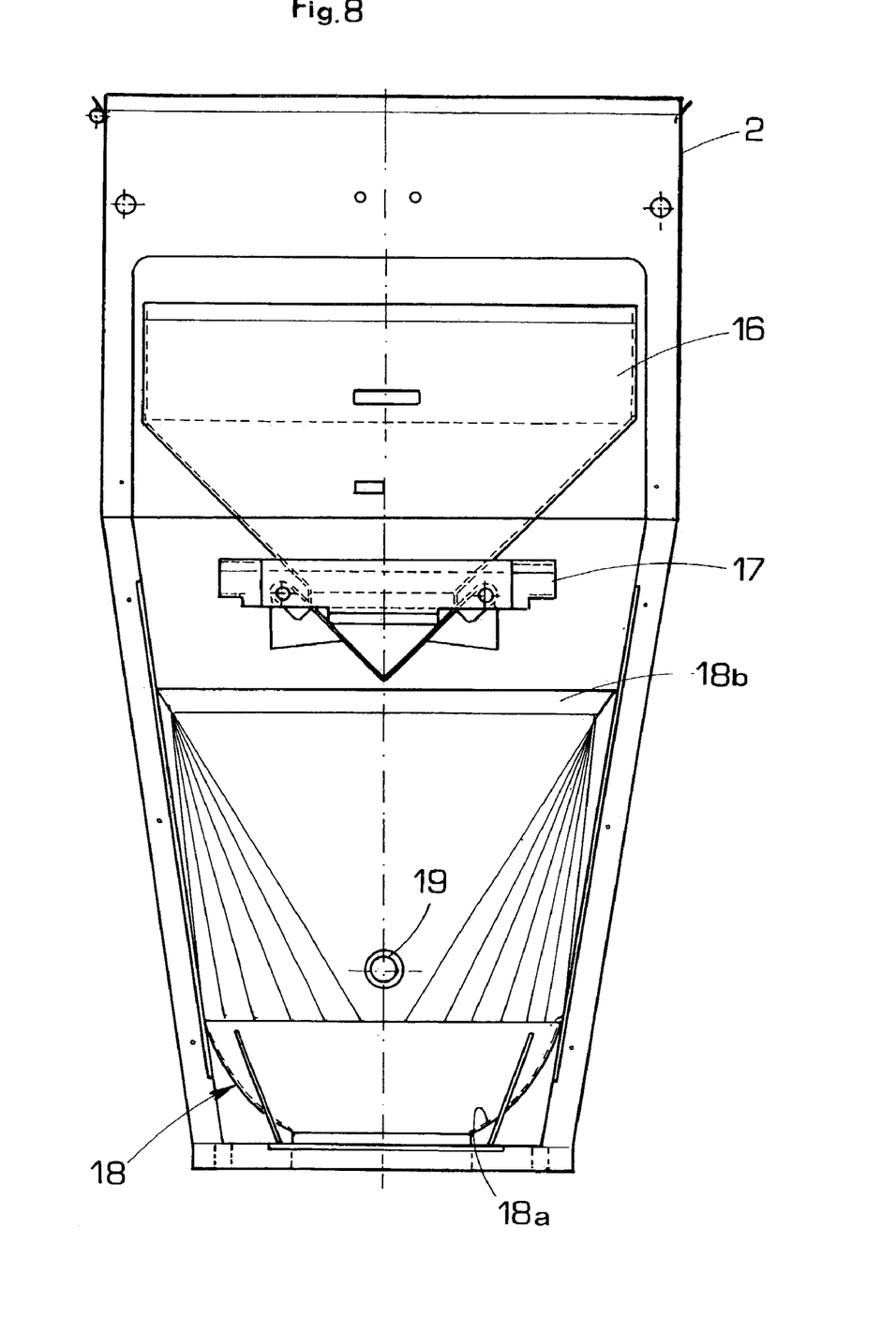
FIGS. 8 and 9 are each a diagrammatic front elevation view on an enlarged scale of the apparatus of FIG. 1 with no loading hoppers and wherein a weighing hopper is at a weighing and loading position, respectively.
Figure 9:
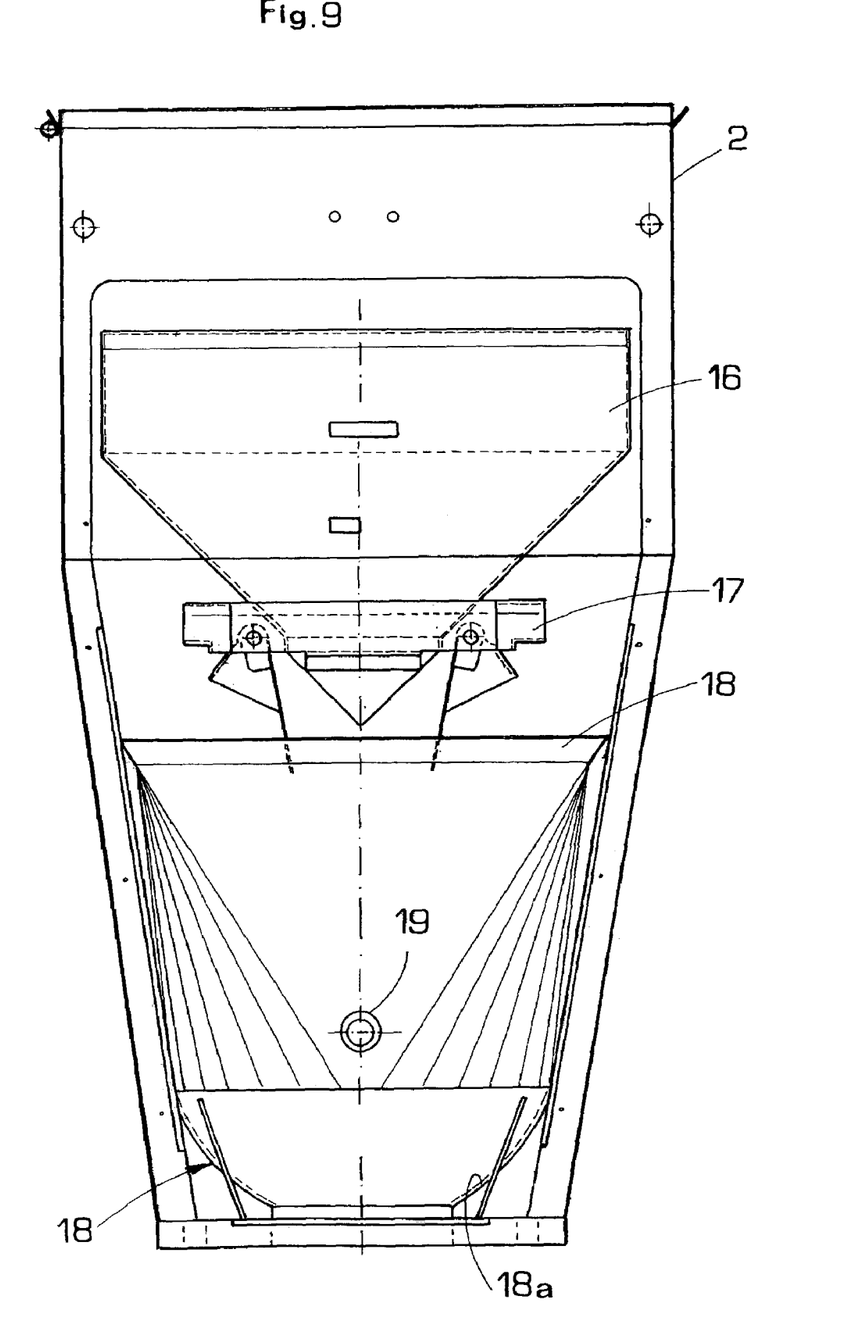

Underneath the discharge outlets of the loading hoppers a weighing hopper 16 is provided (FIGS. 8 and 9) which has a discharge outlet and an opening-closing device 7 for its discharge outlet, and is designed to receive dosed quantities of different granular materials from the loading hoppers. The weighing hopper 16 is overhangingly supported by a support element 17 articulated about a horizontal axis within frame 2 and having a portion 17a extending out of the wall adjacent to the frame (FIG. 2).

Between frame 2 and the outwardly extending portion of the support element 17 a transducer of any suitable type is provided, which is located outside the frame and designed to generate electric output signals proportional to the weight of the material discharged into the weighing hopper 16. With this arrangement a separation between weighing hopper 16 within frame 2 and control mechanisms supported outside the frame is achieved.

Preferably, support element 17 is arranged inclined with respect to a vertical line in its portion lying inside frame 2, so that grains of granular material are prevented from being deposited and resting on it.

Figure 1:
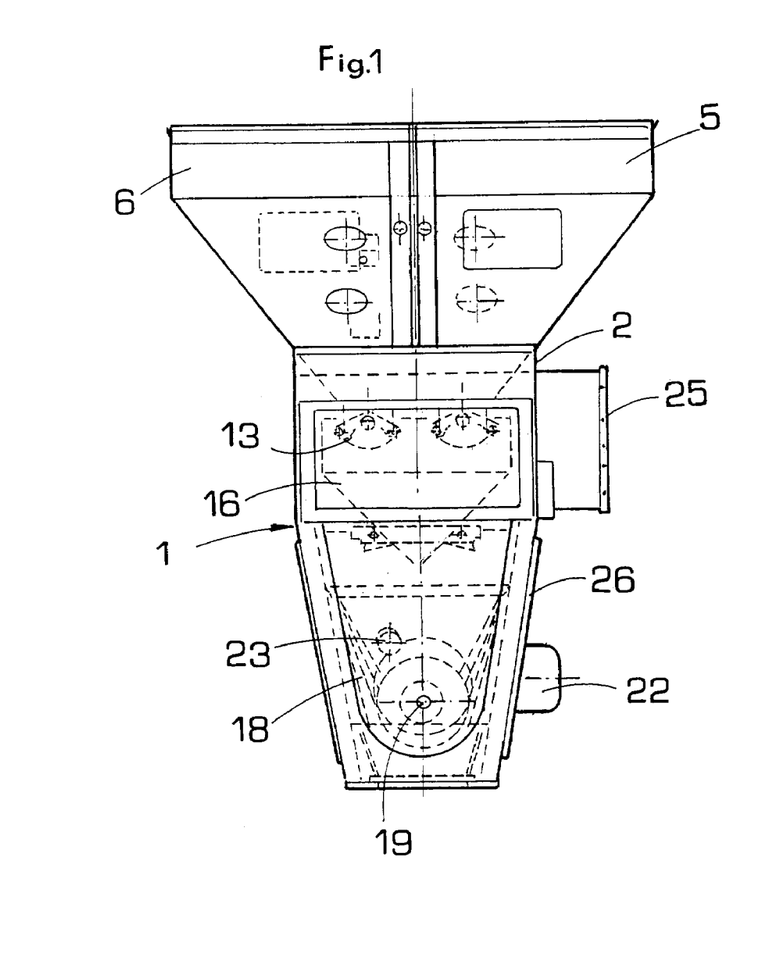
FIG. 1 is a front elevation view of a gravimetric dosing and mixing apparatus according to the present invention.

Underneath the weighing hopper 16, dosing apparatus 1 comprises a mixing assembly 18 supported at its base by frame 2 and designed to receive from the weighing hopper granular material that has been previously dosed by loading hoppers 3–6 and weighed in weighing hopper 16. Mixing assembly 18 has an inner chamber, the lower portion of which is hemispherical in shape, and a free upper inlet opening 18b for receiving granular material to be mixed. Within chamber 18a a mixer having a pair of perforated and juxtaposed spirals 20 and 21 is mounted for rotation about a horizontal shaft 19 and, when set in rotation by a suitable motor-reduction unit 22 (FIGS. 1 and 2), exerts a lifting action of the granular material towards the central zone of the inner chamber 18a whilst discharging the material itself laterally towards the ends of shaft 19, some material also flowing through perforated spirals 20 and 21. The overall level of the granular material within the mixer remains however substantially unchanged, which makes it possible to continuously and effectively operate a level indicator 23 located in the mixer.

The two hemispherically outlined spirals 20 and 21 also act as a scraper for the hemispherical bottom of the mixer, whereby preventing deposits and scaling or stagnation from being formed on it.

The opening-closing devices 7 and the motor-reduction unit 22 can be controlled by an electronic program control unit 25 designed to receive input signals from the transducer urged by the support element 17 to selectively program control the opening-closing devices 7, possibly also to effect additions of granular material to the weighing hopper whenever the amount previously dispensed by a specific loading hopper is lower than that provided in the programmed recipe.

The transducer is formed by one or more digital weighing cells designed to carry out a certain number e.g. n=25 of weighings per second, among which a number e.g. k=16 of weighings regarded as being valid, among which three must be equal to each other, is program selected by the control unit 25. In this way a response speed of jacks 12 is provided, which is at least 20 times greater than that hitherto achievable, whilst preventing at the same time ambient temperature changes from affecting the precision of the weighings, and a weighing resolution of the order of 0.1 g can be accomplished.

Control unit 25 is suitable for storing a great number, e.g. 200, of recipes and it can be accessed by means of a keyboard or keypad, which acts just as an input unit or operator's interface and not as a recipe memory, with the advantage that when a battery of dosing apparatuses are available, each dosing apparatus stores a certain number of recipes in its memory which are directly accessible by the operator.

Frame 2 is preferably tight sealed at the front by a door 26 provided with gaskets to prevent powder material from spilling, thereby polluting the environment.

If desired, the dosing apparatus can be coupled with one or more units, e.g. 4 in number, suitable for carrying out additional very fine dosing operations.

The invention as described above is susceptible to numerous modifications and variations, all of them within the scope of the invention as defined by the claims.

Thus, for instance, a control circuit is preferably provided to interrupt the operation of the dosing machine whenever any loading hopper 3 to 6 were not positioned at the top of the support frame 2 or arranged thereon in an improper fashion.

Moreover, one or more auxiliary units not shown in the drawings and of any suitable type can be applied to the dosing apparatus 1, designed to controllably feed the weighing hopper 16 directly, should fine dosages of granular material be required.

The invention claimed is:

1. A gravimetric dosing apparatus comprising:
   a support frame;

a plurality of loading hoppers for a respective granular material to be dosed, each carried by said support frame and provided with a respective discharge outlet and an opening-closing device for their respective discharge outlet;

inclined calibration flaps disposed at each loading hopper discharge outlet, the calibration flaps being sized and positioned to prevent material discharged by the hoppers from falling out laterally of the respective opening-closing device;

a weighing hopper including a discharge outlet and an opening and closing device for its respective discharge outlet and arranged in cascade with respect to said loading hoppers to receive from at least two of said hoppers dosed quantities of different granular materials;

a support element articulated to said frame and designed to overhangingly support said weighing hopper;

transducing means located outside said frame between said frame and said articulated support element and designed to generate output signals proportional to the weight of the material discharged into said weighing hopper;

a mixing assembly carried by said support frame and arranged in cascade with respect to said weighing hopper, whereby dosed and weighed granular material is received therefrom; and a program control unit that receives input signals from said transducer means and that program controls said opening-closing devices, wherein each of said opening-closing devices comprises a pair of opening and closing bucket-like elements articulated to one another about a common articulation axis, a reciprocating actuator means, and a fork-shaped linkage member having one fork-shaped end pivoted to said bucket-like elements, respectively and having an opposite end pivoted to said reciprocating actuator means, thereby obtaining short response times of said opening-closing device.

2. An apparatus according to claim 1, wherein each opening-closing device comprises an electrovalve including a pair of driving solenoids and fixed underneath to a wall extension of its respective hopper, an opening being formed in said extension at each of said solenoids.

3. An apparatus according to claim 1, wherein said support element is inclined inside said frame with respect to a vertical line.

4. A gravimetric dosing apparatus comprising:
a support frame;
a plurality of loading hoppers for a respective granular material to be dosed, each carried by said support frame and provided with a respective discharge outlet and an opening-closing device for their respective discharge outlet;
a weighing hopper including a discharge outlet and an opening and closing device for its respective discharge outlet and arranged in cascade with respect to said loading hoppers to receive from at least two of said hoppers dosed quantities of different granular materials;
a support element articulated to said frame and designed to overhangingly support said weighing hopper;
transducing means located outside said frame between said frame and said articulated support element and designed to generate output signals proportional to the weight of the material discharged into said weighing hopper;
a mixing assembly carried by said support frame and arranged in cascade with respect to said weighing hopper, whereby dosed and weighed granular material is received therefrom; and
a program control unit that receives input signals from said transducer means and that program controls said opening-closing devices,
wherein each of said opening-closing devices comprises a pair of opening and closing bucket-like elements articulated to one another about a common articulation axis, a reciprocating actuator means, and a fork-shaped linkage member having one fork-shaped end pivoted to said bucket-like elements, respectively and having an opposite end pivoted to said reciprocating actuator means, thereby obtaining short response times of said opening-closing device, and
wherein said mixing assembling comprises an inner chamber having a hemispherical lower portion, a mixer unit having a pair of perforated and juxtaposed spiral members and mounted for rotation about an axis of rotation in said hemispherical lower portion, and a motor reduction unit for said mixer unit, whereby upon rotation said mixer unit exerts a lifting action of granular material towards an intermediate zone of said inner chamber, while laterally discharging granular material, with some granular material flowing through the perforated and juxtaposed spiral members.

5. A gravimetric dosing apparatus comprising:
a support frame;
a plurality of loading hoppers carried by the support frame for housing a respective granular material to be dosed via a respective discharge outlet, each of the loading hoppers including an opening-closing device that selectively opens and closes the respective discharge outlet, wherein each opening-closing device comprises a pair of opening and closing bucket-like elements articulated to one another about a common articulation axis, a reciprocating actuator, and a fork-shaped linkage member having one fork-shaped end pivoted to the bucket-like elements, respectively and having an opposite end pivoted to the reciprocating actuator;
inclined calibration flaps disposed at each loading hopper discharge outlet, the calibration flaps being sized and positioned to prevent material discharged by the hoppers from falling out laterally of the respective opening-closing device;
a weighing hopper arranged in cascade with respect to the loading hoppers to receive dosed quantities of different granular materials;
a transducer operatively coupled with the weighing hopper and disposed outside of said support frame, the transducer generating output signals proportional to the weight of the material discharged into the weighing hopper;
a mixing assembly arranged in cascade with respect to the weighing hopper; and
a program control unit that receives signals from the transducer and that program controls the opening-closing devices.

* * * * *